United States Patent Office

3,839,471
Patented Oct. 1, 1974

3,839,471
OXO PROCESS USING LIGANDS OF THE
TROPOLONE GROUP
John B. Wilkes, Richmond, Calif., assignor to Chevron
Research Company, San Francisco, Calif.
No Drawing. Original application Mar. 20, 1969, Ser. No. 809,028, now Patent No. 3,647,842. Divided and this application June 14, 1971, Ser. No. 153,054
Int. Cl. C07c 27/20, 29/16
U.S. Cl. 260—632 HF                     8 Claims

ABSTRACT OF THE DISCLOSURE

At a temperature in the range 100° C. to 225° C. the destructive dissociation of cobalt carbonyl compounds to cobalt metal and residue is inhibited by the action of oxygen-dentated chelation ligands.

CROSS REFERENCE TO RELATED APPLICATIONS

This application is a division of copending application Ser. No. 809,028, filed Mar. 20, 1969, and now U.S. Pat. 3,647,842.

FIELD OF INVENTION

This invention relates to cobalt carbonyl compounds. More particularly, it relates to a method for the stabilization of cobalt carbonyl complex compounds by inhibiting their dissociation into metallic cobalt and residual components. The inhibition results from the action of an added oxygen-dentated chelation ligand. Still more particularly, it relates to the use of the foregoing stabilization method in the production of alcohols and/or aldehydes from olefinically unsaturated compounds by the cobalt carbonyl catalyzed addition of carbon monoxide and hydrogen to the carbon-to-carbon unsaturation linkage(s) of these unsaturated compounds.

BACKGROUND OF INVENTION

Cobalt carbonyl compounds including dicobalt octacarbonyl, cobalt hydrocarbonyl etc. as such or in modified forms are known for their use as catalysts for a variety of reactions relating to olefinic unsaturated organic compounds including the hydroformylation (oxonation) of olefins, isomerization of olefins, carbonylation of amines and aromatic nitriles, hydrosilation of olefins and the like. These catalyst complexes are subject to serious limitations in that unless carbon monoxide pressures in excess of equilibrium values are maintained in their presence, these compounds destructively dissociate into cobalt metal and residue. Catalytic activity is thus lost and cobalt metal is plated-out on reactor walls and associated transfer piping. From time to time the accumulated metal must be removed by a suitable means, usually by the use of aqueous nitric acid or a similar undesirably corrosive and inconvenient agent.

It is therefore an object of the present invention to provide a method for the stabilization of cobalt carbonyl complex compounds, thereby substantially reducing cobalt metal deposition on the surfaces of reaction vessels and associated lines.

Another object of the invention is to provide a method for the stabilization of cobalt carbonyl complex compounds thereby permitting their effective use as catalysts at lower carbon monoxide pressures and at higher temperatures than may be satisfactorily employed under conventional hydroformylation reaction conditions.

Another object of the invention is to provide a method to inhibit the plating-out of cobalt metal on the surfaces of a system containing cobalt carbonyl complex compounds from the destructive dissociation of cobalt carbonyl complex compounds.

Still another objective is the provision of an improved hydroformylation process in which alcohol is produced in a single stage process by the reaction of an olefinic hydrocarbon with carbon monoxide and hydrogen in the presence of a cobalt carbonyl catalyst and facilitated by added oxygen-dentated chelation ligands. Other objects and advantages of the present invention will become apparent from the ensuing detailed description thereof.

In accordance with the present invention the stability of cobalt carbonyl complex compounds in a system in the presence of carbon monoxide gas is improved at a temperature in the range of from about 100° C. to 225° C. by the addition of an oxygen-dentated chelation ligand having a substantial standard cobalt-ligand association constant.

In a more particular aspect of the invention organic compounds containing olefinic unsaturation are converted to saturated alcohols and/or aldehydes having at least one more carbon atom than the precursor olefinic compounds by the reaction of the compound in the liquid phase with carbon monoxide and hydrogen in a reaction system in which the above described stabilized cobalt carbonyl complex compounds are employed as the catalyst. In a corollary aspect of the invention the plating-out of cobalt metal on the surfaces of systems containing the aforementioned cobalt carbonyls is inhibited by the addition of the above described ligands.

Surprisingly, the presence of the subject ligands markedly inhibits destructive dissociation of cobalt carbonyl compounds to metal. In their presence, carbon monoxide pressures below conventional equilibrium pressures can be employed with little or no deposition of cobalt metal. Thus, in the presence of the subject ligands operation at elevated temperatures is made possible at considerably lower pressures than are otherwise required, and this permits substantial economies of plant construction and operation. A further advantage of the subject process over the art accrues in that in conventional hydroformylation practice, the hydrogenation of aldehyde to alcohol is inhibited by the necessarily high carbon monoxide partial pressures. The presence of the subject oxygen-dentated ligands permits such a substantial reduction in the carbon monoxide partial pressure of the reaction system that both hydroformylation and hydrogenation can be accomplished in a single reactor and/or with but a single catalyst system.

By an oxygen-dentated chelation ligand as used herein is meant an organic compound containing at least two oxygen atoms, each of which is bonded to a different carbon atom, and wherein these two oxygen atoms are separated by at least two and less than five intermediate atoms of the compound.

In the active form, the suitable stabilized cobalt carbonyl catalysts will contain most of the cobalt component in a reduced valence state. This will usually be a zero valence state, and possibly may even be a −1 valence state.

As used herein, the term "complex compound" relates to combinations of two or more atoms, ions, or molecules which arise as a result of the formation of a bond(s) by the sharing of a pair(s) of electrons originally associated with only one of the components, and the complex possesses some identifiable physical or chemical characteristics of a distinct species.

The oxygen-dentated ligands of the present invention contain at least two oxygen atoms and by reason of the prescribed spatial relationship are capable of forming a bidentate or polydentate coordination complex, a chelate, in which a cobalt atom is a member of a heterocyclic ring. The two electron-pair donor oxygen atoms and the atoms intermediate to the two oxygen atoms complete the ring.

Organic compounds in general which contain at least one pair of oxygen atoms and have the aforementioned configuration are suitable ligands for the stabilization of cobalt carbonyl complex compounds provided that the ligand exihibits a substantial standard cobalt-ligand association constant and is free of interfering substituent groups. In general, best results obtain where the ligand-stabilized cobalt carbonyl complex compound is soluble in the reaction system.

By a standard cobalt-ligand association constant as used herein is meant the constant at 18–30° C. in a solution containing at least 25 weight percent of water for the equilibrium:

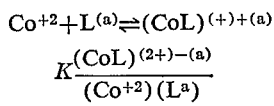

where L is the ligand, $a$ is the charge $(0, 1, -1)$ value of the ligand and where the balance of the solvent is a non-chelating organic oxygen-containing solvent.

By a substantial cobalt-ligand association constant is meant a value for log K (units are liter mol$^{-1}$) as follows:

(1) for a wholly aqueous solvent a value of at least 4
(2) for a 75–25 dioxane-water medium a value of at least 7
(3) for a 75–25 acetone-water medium a value of at least about 7.

For representative data and background information see "Stability Constants of Meal-Ion Complexes" by L. G. Sillen and A. E. Martell, Special Publication No. 17, London; The Chemical Society, Burlington House, 1964.

Cobalt carbonyl complex compounds which are free of cobalt phosphorus bonds and of cobalt-metal bonds, other than cobalt-cobalt bonds, are in general stabilized by the method of the instant invention. Especially advantageous is the use of the present method for the stabilization of dicobalt octacarbonyl, cobalt hydrocarbonyl, and tetracobalt dodecacarbonyl, i.e., cobalt complex compounds and the systems tending to equilibrate which result where mixtures of these materials and carbon monoxide gas are at temperatures in the range from about 100° C. to about 225° C.

The cobalt-containing complexes which are stabilized by the instant method can be prepared by known methods. In this preparation, the subject oxygen-dentated ligands may be present during the generation of the cobalt carbonyl complex compound or subsequent thereto. In general, best results in terms of stabilization effects obtain when these ligands are present initially. Normally these complexes are formed in situ by the reaction of cobalt oxide, a cobalt salt or soap with hydrogen and carbon monoxide at elevated temperatures and pressures in a reaction in which a mixed species of carbonyls appear to be formed including dicobalt octacarbonyl, cobalt hydrocarbonyl and a cobalt salt, Co[Co(CO)$_4$]$_2$. The mixture tends to equilibrate as between these species and at a lower rate, in the absence of the subject ligands, with cobalt metal. The mechanism of the present stabilization may actually be a kinetic hindrance of the latter stage. The medium for the in situ preparation in general comprises a liquid reactant, for example an unsaturated organic compound or an olefinic hydrocarbon, from a reaction system for which the cobalt carbonyl complex is to serve as a catalyst. Inert liquid media or diluents such as saturated hydrocarbons, aromatic hydrocarbons, alcohols, high-boiling reaction by-products, etc. as known in the art may also be employed.

The amount of the subject oxygen-dentated ligands which should be present for satisfactory results varies and in general appears to be functionally related to the cobalt-ligand association constant. That is, for a given stabilization (time-temperature and corresponding degree of cobalt metal formation) a smaller amount of a ligand having a high association constant will be required for satisfactory stabilization than of a ligand having a relatively lower association constant. Oxygen-dentated chelation ligands satisfactory for use in the present invention should have a cobalt-ligand association constant, water medium, of at least about 10$^4$ liter mol$^{-1}$, or, 75–25 dioxane-water medium of at least about 10$^7$ liter mol$^{-1}$, or corresponding values for other water-non-chelating organic solvent media. In general, the stabilizing effect increases as the association constant becomes larger.

The relative amount of the added oxygen-dentated ligand which should be present varies. Usually even a trace, i.e., of the order of 10$^{-4}$ mols per atomic weight of cobalt, is helpful. However, as a practical matter, in general at least about 0.001 mol of the ligand per atomic weight of cobalt in the cobalt carbonyl complex compound should be added. Good results are usually experienced when for each atomic weight of cobalt there is present in the system an amount of the ligand in the range 0.05 to 0.5 mol. Larger amounts of added ligand may be desirable where the ligand has a relatively small association constant. For example, in the case of salicylaldehyde $(K \sim 5 \times 10^4)$, as much as 2 mols of the aldehyde per atomic weight of cobalt is a useful ratio, whereas for a ligand such as salicyclic acid $(K \sim 5 \times 10^6)$, only one-quarter to one-half as much ligand should be present. Usually, better results obtain when the ratio is substantially less than stoichiometric, i.e., is in the range 0.1–0.25 to 1.

Organic compounds containing the aforedescribed bidentate functional grouping, i.e., the two oxygen atoms plus the associated intermediate atoms, having a substantial cobalt-ligand association constant and free of interfering groups, are useful in the practice of the instant invention. Thus, within the contemplated scope of the invention are compounds of all structural variations compatible with the presence of the above bidentate functional group.

Representative structural-types include acyclic, cyclic polycyclic, heterocyclic and mixed structural variations thereof.

The electron pair donor atoms of the ligand, the oxygen atom pair, may be present in any carbon-oxygen functional group. Representative carbon-oxygen functional groups include carbonyl, carboxyl, ester, ether, aldehyde, and the like groups.

The carbon skeleton of the ligand compound may be saturated, partially saturated, aromatic and mixtures thereof.

Preferably, the oxygen-dentated ligands used in the practice of the invention are composed of carbon, hydrogen and oxygen, and preferably are soluble in the reaction system. The ligand may, however, contain one or more non-interfering functional groups substituted for one or more hydrogen atoms attached to carbon atoms which are not included in the bidentate functional grouping, i.e., the two oxygen atoms which together with the intermediate atoms of the compound and a cobalt atom can form a heterocyclic chelate ring.

By non-interfering substituent groups, as used herein, is meant —SO$_3$R (R is hydrogen or a hydrocarbyl group); non-chelating (i.e., located outside of the bidentate functional grouping, as defined above) hydroxyl, carboxyl, ether, ester, keto, or aldehydes functional group; non-chelating nitrogen groups as amino, imino, nitrilo, and amide groups; and halogen groups as fluoride, bromide, and chloride.

Representative oxygen-dentated ligands useful in the practice of this invention include salicylic acid, 4-ethyl salicylic acid salicylaldehyde, 4-methoxysalicylaldehyde, catechol, 3-hydroxy-2-methyl-4-pyrone, kojic acid, tropolone, α-methyl-tropolone, β-methyltropolone, α-isopropyltropolone, β-isopropyltropolone, 2,4-pentanedione, hexane-2,4-dione, 3-methylpentane-2,4-dione, 5-methylhexane-2,4-dione, 2-acetylcyclohexanone, 3-allylpentane-2,4-dione, 5,5-dimethylhexane-2,4-dione, 1,5-diphenylpentane-1,3,5-trione, 1-ethoxy-2,4-butane-dione, 1-ethoxy-3-phenyl-1,3-propanedione, 1,6-diphenyl-1,3,4,6-hexanetetraone, 1,14-diphenyl-1,3,12,14-tetradecanetetraone, 1-acetyl-2,4-pentanedione, 1-crotonyl-2,4-pentanedione, 1-octanoyl-2,4-pentanedione, 1-oleyl-2,4-pentanedione, 1,5-diphenyl-2,4-pentanedione, 3-phenyl-2,4-pentanedione, 3-n-propylsalicylaldehyde, 5-methylsalicylaldehyde, 4,6-dimethylsalicylaldehyde, 3-ethoxysalicylaldehyde, ethylacetoacetate, methylacetoacetate, ethylbenzoylacetate, ethylbenzoylpyruvic acid, benzoylpyruvic acid, benzoylacetone, o-hydroxybenzoylacetone, benzoyl-2-furoylmethane, 2-benzoylcylohexanone, dibenzoylmethane, o-methoxydibenzoylmethane, 2-benzoylindane-1-one, 5-hydroxy-1,4-naphthaquinone, 2-hydroxy-1-naphthaldehyde, 1-hydroxy-2-naphthaldehyde, 1 hydroxyanthraquinone, 1,8-dihydroxyanthraquinone, 3-hydroxyflavone, 1,3-bis (p-methoxyphenyl)-propane-1,3-dione.

Representative oxygen-dentated ligands with substituents other than C, H, and O include 5-sulfosalicylic acid, 5-chlorosalicylic acid, 1,1,1 - trifluoropentane-2,4-dione, chlorokojic acid [3-chloro-5-hydroxy-2-hydroxymethyl-4-pyrone], 3-chlorosalicylaldehyde, 4-chlorosalicylaldehyde, 5-bromo-salicylaldehyde, 6,7-dihydroxynaphthalene-2-sulfonic acid, 1,1,1-trifluoro-1-naphthoylacetone.

In particular, ligands of the formula $AR(CO_2R)(OR)(R)_n$, in which the (OR) and ($CO_2R$) groups, relative to each other, are in the ortho or 1,2-geometrical relationship, are preferred for use as stabilizers in the present invention. AR of the formula is an aromatic hydrocarbon nucleus containing less than 15 aromatic carbocyclic carbon atoms, the R groups of the formula may be the same or different groups and are hydrogen or an alkyl group having a carbon atom content in the range 1 to 50 and $n$ is the balance of the extra-carbocyclic valences of the aromatic ring, i.e., 4 for the benzene ring, 6 for naphthalene, 10 for biphenyl, etc. The effect of the aromatic nucleus of this class of compounds appears in general to enhance the cobalt-ligand association constants relative to the aliphatic-type ligands and to thus provide a better stabilization effect.

The ligands of the tropolone group are also preferred. These compounds are semi-aromatic, if not actually aromatic, in character and they, too, exhibit substantial cobalt-ligand association constants. They are of the formula

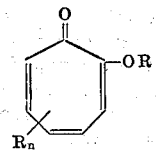

in which the R groups are the same or different and are hydrogen or an alkyl group having a carbon atom content in the range 1 to 50 and $n$ is 5.

In accordance with the invention and in particular aspect thereof alcohols and/or aldehydes are prepared by the hydroformylation of olefinic compounds by intimately contacting them in the liquid phase with hydrogen and carbon monoxide in a reaction catalyzed by complex cobalt carbonyl compounds and stabilized by the presence of added oxygen-dentated ligands at well defined conditions of temperature and pressure.

The principal effect of the presence of oxygen-dentated ligands of the invention upon cobalt carbonyl complex compounds is that of inhibiting their destructive dissociation with the formation of cobalt metal. Little or no interference with the normal catalytic action of cobalt carbonyl compounds occurs from the presence of the added ligands. Thus, in general, in the employment of the stabilized cobalt carbonyls of the invention the conditions which are satisfactory as known in the art are also satisfactory herein. For example, in olefin hydroformylation, suitable reaction temperatures are in the range 100–225° C., preferably from about 125° to about 200° C. Suitable catalyst-to-feed ratios may vary widely and preferably are varied to achieve, where possible, a substantially homogenous reaction mixture. Catalyst concentrations, based upon olefin feed (weight percentages) and calculated as cobalt metal in the range 0.05 to 5.0 weight percent are usually satisfactory. Preferred amounts ordinarily are in the range 0.1 to 0.5.

At elevated temperatures, cobalt carbonyl compounds are normally maintained as carbonyls by subjecting them to substantial partial pressures of carbon monoxide. These pressures may be satisfactorily employed in the instant invention, but in general the stabilizing action of the subject oxygen-dentated ligands markedly lowers the partial pressure of carbon monoxide required for this purpose. Thus, for the present process, system pressures may vary from about 50 p.s.i.g. at temperatures of the order of 75° C. up to as much as 4000–5000 p.s.i.g. at temperatures of the order of 225° C. The advantages of the instant invention are optimal at the relatively moderate pressures of the range from about 100 to 2000 p.s.i.g.

The ratio of hydrogen to carbon monoxide charged may vary widely within the scope of the invention. Usually, a mol ratio of hydrogen to carbon monoxide in the range 0.5–10 to 1, respectively, is satisfactory. The range 1–3 to 1 is preferred. The synthesis gas (from the partial combustion of natural gas or naphtha) of commerce is a particularly useful mixture.

Olefinically unsaturated organic compounds as known in the hydroformylation (oxo) art are, in general, satisfactory feeds for use in the present invention. Preferred feeds are mono-olefinic hydrocarbons. Of these, linear olefins of the $C_3$ to $C_{20}$ range, propylene oligomers and the like, are the more desirable feeds. Where branched chain olefins are used for the production of oxo-alcohols, it is often more advantageous to effect the carbon monoxide-hydrogen addition to the olefinic double bond at about 140–170° C. and to subsequently heat the reaction mixture to a higher temperature (180–210° C.) where the reduction of the aldehyde group proceeds more favorably.

Representative olefinic hydrocarbons suitable for use herein include ethene, propene, 1-hexene, cyclohexene, betapinene, alpha-pinene, 2-heptene, 3-ethylpentene-1, 2-methylpentene-2, cyclopentene, di-isobutylene, propylene trimer, codimer heptenes, vinylcyclohexene, cyclododecene, 3-eicosene, 1-dodecene and the like olefinic hydrocarbons.

Cobalt Carbonyl Stability Test

The stabilizing action of oxygen-dentated ligands upon complex cobalt carbonyl compounds is shown by means of a suitable test. The relative stabilizing action of oxygen-dentated ligands upon these carbonyl compounds is shown by subjecting them to a standard set of conditions with and without the added ligand. These conditions include:

Temperature, ° C. _____ 190.
Time, hrs. _____ 6.
Solvent _____ Mixed alcohol-alkane.[1]
$H_2$:CO mol ratio _____ 2:1.
Pressure, p.s.i.g. _____ 1600–1800.

[1] With 0.236 grams of cobalt as octanoate in 50 g. n-heptane+50 g. $C_{12}$—$C_{15}$ oxo alcohol.

The test is carried out in a stainless steel rocking autoclave having a glass liner. Under these conditions cobalt salts such as cobalt 2-ethylhexanoate are rapidly converted to complex cobalt carbonyls. Therefore, as a matter of convenience, the salt rather than the carbonyl compound is charged to the autoclave. After the six hours at temperature with agitation, the autoclave and contents is cooled to room temperature and vented. The solution is then filtered and analyzed for cobalt carbonyl by infrared absorption at 2041 cm.$^{-1}$. Metallic solid if present and its form is noted. In the absence of stabilizers and under the foregoing conditions all of the cobalt carbonyl is converted to a cobalt metal plate which is found adhering to the walls of the glass liner and autoclave. In the presence of an effective stabilizer, little or no metal plating-out occurs, or but small amounts of filterable metal powder are formed. With stabilizers of intermediate effectiveness, little or no metal is found in the liner; but metal is found outside the liner, either deposited on the external liner wall or the autoclave wall, or loosely lodged between the liner and the autoclave wall. Decompositions outside the liner appear to be due to the higher temperatures which exist at the autoclave wall because of the proximity of the heating element and the low level of the stabilizer. The stabilizer inhibits decomposition of the cobalt carbonyl in the solution inside the liner, but does not prevent some diffusion through the vent holes in the liner into the void between the liner and the autoclave inner wall. In Table I below is listed a number of representative test results.

TABLE II

| Hydroformylation type | Conventional | | Oxygen-dentated Ligand stabilized |
|---|---|---|---|
| Example | 7 | 8 | [1] 9 |
| Hydroformylation conditions: | | | |
| Temp., °C | 175 | 200 | 190 |
| Pressure, p.s.i.g | 3,500 | 4,400 | 2,200 |
| Carbon monoxide | 1,550 | 3,000 | 700 |
| Hydrogen | 1,850 | 1,400 | 1,400 |
| Time, min | | 180 | 108 |
| Hydrogenation conditions | | ([2]) | ([2]) |
| Temp., °C | 140 | | |
| Pressure, p.s.i.g | 1,400 | | |
| Yields, wt., percent of feed olefin: | | | |
| Alcohol | 82 | 85 | 88 |
| Paraffin | 8 | 12 | 6 |
| Thick oil | 16 | 10 | 12 |

[1] Tropolone ligand used at ratio of 1 mol per mol $Co^{2+}$.
[2] Not needed.

TABLE I

| No. | Ligand used Type | Wt. percent of solution [1] | Mols per mol cobalt | Cobalt as $Co_2(CO)_8$ percent of cobalt fed | Ligand-cobalt association constant | Observations |
|---|---|---|---|---|---|---|
| 1 | None | | | None | | Mainly metal plated inside liner walls. |
| 2 | Salicylic acid [2] | 0.14 | 0.25 | 43 | $5 \times 10^3$ | No metal, $Co(CO)_4^-$ present. |
| 3 | Tetrapropenylsuccinic acid.[3] | 0.1 | 0.08 | 16 | $\sim 10^2$ | Some metal powder in liner. |
| 4 | Acetylacetone | | 2 | [4] 0 | $2 \times 10^5$ | Metal powder but no plating-out. |
| 5 | Salicylaldehyde | 0.95 | 2 | 14 | $5 \times 10^4$ | Do. |
| 6 | 1,4-dihydroxyanthraquinone | 0.05 | 0.05 | 0 | | Metal plate outside liner. |

[1] All runs with 0.236 grams of cobalt as octanoate in 50 g. n-heptane+50 g. $C_{12}$-$C_{15}$ oxo alcohol.
[2] Pyridine added to promote cobalt carbonyl formation.
[3] Trace water added—no adverse effect.
[4] Where oxo alcohol omitted from solvent, cobalt carbonyl remains fully stable in presence of acetylacetone.

The foregoing examples illustrate that oxygen-dentated ligands are advantageous for the stabilization of complex cobalt carbonyl compounds. In the absence of these stabilizers, in order for there to be a reasonable stabilization of cobalt carbonyls, there must be a carbon monoxide partial pressure of about 2500 p.s.i.g. at 190° C. In the above examples the carbon monoxide partial pressure was only 530–600 p.s.i.g. Thus, the presence of the stabilizers permit large reductions in the carbon monoxide partial pressure.

Even where the stabilizing action of the ligand was not sufficient to maintain at least some cobalt carbonyl values in the system after six hours of the severe test conditions, nevertheless the presence of the ligands (example 4) has a salutory effect. Ordinarily reaction times are less than six hours and stabilizers such as acetylacetone and salicylaldehyde and the like are actually effective for these periods. In addition, the loss of stabilization activity by these materials appears to be due to their reducibility. Thus at lower reaction temperature where hydrogenation is not favored and where aldehyde products predominate, these stabilizers are more effective. A further advantage resulting from the use of the oxygen-dentate ligands as demonstrated by the examples is that such cobalt metal as is produced is in the form of a loose metal powder rather than as an adhering plated-out film upon the raction system surfaces.

Examples 7–9

Advantages of the instant process are illustrated by comparative examples in which $C_{13}$–$C_{14}$ α-olefin feeds are converted to oxo alcohols in a cobalt carbonyl catalyzed hydroformylation using commercial catalyst requirements, e.g., 0.2–0.35 weight percent of cobalt based upon olefin and other conditions, as noted as follows:

From the above examples it is seen that in the absence of the stabilizing oxygen-dentated ligands of the invention more process stages and/or more severe operating pressures and longer reaction times are required for the hydroformylation of alkenes to alcohols. Thus, in example 7, two process stages were required for the production of alcohol. In addition, a decobalting step between the hydroformylation and hydrogenation is necessary. Also, a separate hydrogenation catalyst requirement is involved. On the other hand, in a conventional single stage hydroformylation to alcohol as in example 8, inconvenient and extremely high operating pressures are necessary. In general, equipment costs and operating costs are seriously increased by such high operational pressure requirements. As shown in example 9, the process of the present invention permits the use of substantially lower pressures and a single stage process for the production of alcohol from olefins and hydrogen costs are less because synthesis gas rather than pure hydrogen can be employed.

These data indicate that the subject ligands do not change the nature of the effective cobalt carbonyl catalyst species in a hydroformylation. It further appears that the action of these ligands in facilitating a hydroformylation reaction is in the nature of inhibiting cobalt metal formation. Cobalt carbonyl catalyzed hydrogenations of oxo aldehydes are favored by high temperatures (180–200° C.) and by low pressures of carbon monoxide. Thus, the presence of the instant ligands permits operation under conditions which permit effective conversion of olefins to alcohols in a single stage and in good yields.

Examples 10–18

In these runs a $C_{13}$ alpha olefin feed was hydroformylated in a stirred autoclave under the conditions noted in Table III below with the results as noted.

TABLE III

Stability of cobalt catalyst in oxo runs effects of acetylacetone and of carbon monoxide preteatment

| Example | Cobalt Wt., Percent of olefin | Source [1] | Acetylacetone moles/mole cobalt Added as Hacac [2] | Total | Initial gas Type | Pressure, p.s.i.g. | Reaction conditions [4] Temp., °C. | $H_2$:CO Ratio | Pres., p.s.i.g. | Time hours | Cobalt as metal |
|---|---|---|---|---|---|---|---|---|---|---|---|
| 10 | 0.68 | Co(Oct)$_2$ | 0 | 0 | CO | 500 | 193 | 2:1 | 1,500 | 2 | All, plated out. |
| 11 | 0.68 | Co(Oct)$_2$ | 2 | 2 | CO | 500 | 193 | 2:1 | 1,500 | 2 | None. |
| 12 | 0.46 | Co(acac)$_2$ | 0 | 2 | $H_2$+CO [3] | 1,500 | 193 | 2:1 | 1,500 | 2 | All, loose powder. |
| 13 | 0.46 | Co(acac)$_2$ | 0 | 2 | $H_2$+CO [3] | 2,200 | 193 | 2:1 | 2,200 | 2 | None. |
| 14 | 0.46 | Co(acac)$_2$ | 4 | 6 | $H_2$+CO [3] | 2,060 | 193 | 2:1 | 2,060 | 2 | All, loose powder. |
| 15 | 0.46 | Co(acac)$_2$ | 4 | 6 | CO | 500 | 193 | 2:1 | 2,140 | 2 | None. |
| 16 | 0.92 | Co(acac)$_2$ | 0 | 2 | CO | 500 | 190 | 1.5:1 | 1,400 | 2 | Do. |
| 17 | 0.39 | Co(acac)$_2$ | 0 | 2 | CO | 250 | 151 | 2:1 | 1,125 | 12 | Do. |
| 18 | 0.39 | Co(acac)$_2$ | 0 | 2 | CO | 700 | 210 | 1.7:1 | 2,560 | 2 | Do. |

[1] Cobalt sources: Co(Oct)$_2$ is Cobalt" octoate (2-ethylhexoate); Co(acac)$_2$ is acetylacetone derivative of Cobalt".
[2] Hacac is acetylacetone.
[3] Initial gas added at reaction temperature in these runs. Added at room temperature in other runs
[4] All runs in glass liner with 25 g. C$_{13}$ alpha-olefin and 75 g. n-heptane.

In the absence of an oxygen-dentate ligand, acetylacetone, in run 10, all of the cobalt metal plated out. Under the same conditions as run 10 except that a ligand is added, run 11, none of the cobalt is converted to metal, and there is an effective stabilization.

Where both hydrogen and carbon monoxide are present initially in the formation of the cobalt carbonyl complex compound, runs 12, 13 and 14, a high conventional carbon monoxide pressure, run 13, is necessary to prevent cobalt metal deposition. On the other hand, where the cobalt carbonyl is prepared in the absence of hydrogen, runs 15–18, and then employed in a hydroformylation, there is an effective stabilization of the cobalt. It appears that acetylacetonate (acetylacetone ligand precursor) is easily reducible during formation of the cobalt carbonyl catalyst from cobalt acetylacetonate and carbon monoxide. Hence, in runs 12, 13 and 14 little or no stabilizing ligand is available and all of the cobalt is reduced to metal except where the carbon monoxide pressure is sufficiently high.

Examples 19–36

In these runs a C$_{13}$ alpha olefin feed was hydroformylated in a stirred autoclave under the variety of conditions and using oxygen-dentated ligand catalyst stabilizers as noted in Table IV below. The product composition and other data were as indicated.

In addition to the variety of oxygen-dentate ligands demonstrated, the above examples 19–36 show advantages: (1) for the staging of temperature, a lower first-stage oxonation followed by a higher hydrogenation temperature; (2) for the use of lower relative amounts of ligand where the ligand associates strongly, kojic acid for example; and (3) for the use of higher hydrogen to carbon monoxide mol ratios.

The standard cobalt-ligand association constants for all of the ligands in these demonstrations were in the range above about 10$^4$, water medium, or 10$^7$, dioxane-water medium. These examples establish that oxygen-dentated ligands of the invention are useful and effective stabilizers for complex cobalt carbonyl compounds. They also demonstrate that where some destructive dissociation of complex cobalt compounds into cobalt metal is unavoidable or even desirable, as in a decobalting step in an oxo process, the subject oxygen-dentated ligands inhibit the plating-out of the thus-formed cobalt metal on the surfaces of reactor vessels, lines, etc.

I claim:
1. In the reaction of a C$_2$–C$_{20}$ olefinically unsaturated hydrocarbon with carbon monoxide and hydrogen wherein the reaction is catalyzed by a cobalt carbonyl complex compound, which is free of cobalt-phosphorus bonds and of metal-metal bonds other than cobalt-cobalt bonds, the

TABLE IV.—OXO REACTIONS MODIFIED BY DIKETONES

| Example | Catalyst [3] Cobalt wt., percent of olefin | Ligand Type | Moles per mole cobalt | Conditions [1] Temp., °C. | Pres., p.s.i.g. | Time, min. Induct. | After Induct. | First half life, min. | Products, mole percent Alcohol | Aldehyde | Paraffin | Thick oil |
|---|---|---|---|---|---|---|---|---|---|---|---|---|
| 19 | 0.68 | Acetylacetone | 2 | 182–196 | 1,500 | 0 | 150 | ~10 | 86 | Trace | 10 | 4.3 |
| 20 | 0.46 | do | 2 | 182–195 | 2,200 | 0 | 120 | 6 | 81 | Trace | 11 | 7.8 |
| 21 | 0.47 | Ph—CO—CH$_2$—CO—CH$_3$ | 2 | 188–201 | 2,075 | 14 | 120 | 4 | [3] (80) | Trace | [3] (9) | [3] (11) |
| 22 | 0.47 | Ph—CO—CH$_2$—CO—Ph | 2 | 190–201 | 2,080 | 10 | 120 | 4 | [3] (78) | Trace | [3] (9) | [3] (13) |
| 23 | 0.47 | (CH$_3$O—C$_6$H$_4$—CO)$_2$CH$_2$ | 2 | 189–200 | 2,110 | 10 | 120 | 8 | 80 | Trace | 11 | 9 |
| 24 | 0.49 | Tropolone | 2 | 188 | 2,150 | 18 | 155 | ~45 | [3] (21.3) | [3] (58.2) | (7) | [3] (10) |
| 25 | 0.47 | do | 1 | 190 | 2,200 | 5 | 108 | 6 | 81 | Trace | 6.6 | 12 |
| 26 | 0.92 | Kojic acid | 2 | 190 | 1,516 | | 120 | >120 | 0 | 10.8 | 0 | |
| 27 | 0.69 | do | 1 | 190 | 2,125 | 0 | 130 | 30 | 55 | 6.2 | 7 | |
| Effects of temperature | | | | | | | | | | | | |
| 28 | 0.39 | Acetylacetone | 2 | 210 | 2,560 | 0 | 120 | 4 | 81 | Trace | 12 | 6.4 |
| 29 | 0.39 | do | 2 | 171 | 1,775 | 20 | 136 | | [3] (60) | [3] (5.4) | [3] (6) | |
| 30 | 0.39 | do | 2 | 151 | 1,125 | 80 | 750 | 30 | 78 | 0.5 | 5.7 | 16 |
| 31 | 0.47 | Ethyl acetoacetate | 2 | 151 / 190 | 2,100 | 90 | 55 / 100 | 10–15 | 78 | Trace | 3.7 | 18 |
| 32 | 0.47 | Acetylacetone | 0.5 | 151 | 2,160 | 70 | 250 | 10 | [3] (19) | [3] (28) | [3] (3) | |
| 33 | 0.38 | do | 2 | 151 / 190 | 1,870 / 2,290 | 30 | 120 / 110 | 75 | 81 | Trace | 4.4 | 13.5 |
| Effects of H$_2$:CO ratio [4] | | | | | | | | | | | | |
| 34 | 0.38 | Hacac (4:1 H$_2$:CO) | 2 | 151 | 2,025 | 30 | 300 | 10 | 67 | 3 | 8 | 22 |
| 35 | 0.92 | Hacac (4:1 H$_2$:CO) | 2 | 135 / 177 | 2,025 | 75 | 210 / 90 | ~10 | 78 | Trace | 6.4 | 15 |
| 36 | 0.92 | Hacac (5:1 H$_2$:CO) | 2 | 107 / 168 | 1,775 / 1,880 | 5 | 103 / 100 | 40 | 85 | Trace | 4.5 | 9.8 |

[1] All runs with 75 g. n-heptane, 25 g. C$_{13}$ alpha-olefin; except as noted, 2:1 H$_2$:CO.
[2] Catalyst formed from Cobalt$^{II}$-2 ethylhexoate, except for runs with acetylacetone:cobalt of 2:1.
[3] These analyses by gas-liquid chromatography only. Other based on distillation plus GLC.
[4] Hacac is acetylacetone. Metal formed in Examples 35 and 36.
[5] Cobalt salts converted cobalt carbonyl at higher temperature before adding olefin.

improvement which comprises carrying out the reaction at a temperature in the range from 75° C. to 225° C. and about 50 to 5000 p.s.i.g. and with the reactants in contact with from 0.001 to 1 mole per gram of cobalt of an oxygen-dentated chelation ligand of the formula

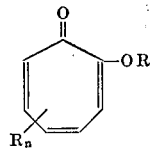

wherein the R groups are the same or different and are hydrogen or an alkyl group having a carbon atom content in the range 1 to 50 and wherein $n$ is 5, thereby inhibiting the dissociation of said catalyst to metallic cobalt and residue which occurs in the absence of the ligand.

2. The improvement as in Claim 1 further characterized in that the temperature is in the range from about 125° C. to about 200° C.

3. The improvement as in Claim 1 further characterized in that for each atomic weight of cobalt there is present an amount of the ligand in the range from about 0.05 to about 0.5 mol.

4. The improvement as in Claim 1 further characterized in that for each atomic weight of cobalt there is present an amount of the ligand in the range from about 0.1 to 0.25 mol.

5. The improvement as in Claim 1 further characterized in that the ligand is tropolone.

6. The improvement as in Claim 1 further characterized in that said ligand is present while said complex compound is produced by the reaction of carbon monoxide and a cobalt salt or oxide and in the absence of added hydrogen gas.

7. The improvement as in Claim 1 further characterized in that the unsaturated compound is a mono-olefinic hydrocarbon.

8. In the reaction of a $C_{13}$–$C_{14}$ alpha olefin with carbon monoxide and hydrogen catalyzed by a cobalt carbonyl complex compound which is free of cobalt phosphorus bonds and of metal-metal bonds other than cobalt-cobalt bonds, the improvement which comprises effecting the reaction at a temperature of about 190° C. and a pressure below about 2200 p.s.i.g. and wherein for each atomic weight of cobalt there is about 1 mol of tropolone present.

References Cited

UNITED STATES PATENTS

| | | | |
|---|---|---|---|
| 3,274,263 | 9/1966 | Greene et al. | 260—632 HF |
| 3,488,296 | 1/1970 | Senn et al. | 260—632 HF |
| 3,454,649 | 7/1969 | Cull et al. | 260—638 HF |
| 3,576,881 | 4/1971 | Senn | 260—632 HF |
| 3,594,425 | 7/1971 | Brader et al. | 260—632 HF |
| 2,576,113 | 11/1951 | Hagemeyer | 260—638 HF |
| 2,641,613 | 6/1953 | Mertzweiller et al. | 260—638 HF |
| 3,404,188 | 10/1968 | Privette et al. | 260—638 HF |

JOSEPH E. EVANS, Primary Examiner

U.S. Cl. X.R.

260—448.2 E, 598, 604 HF, 617 HF, 631.5, 638 HF, 683.65